No. 608,170. Patented Aug. 2, 1898.
J. BIGELOW.
CIGAR HOLDER AND TOBACCO PIPE.
(Application filed Nov. 6, 1897.)
(No Model.)
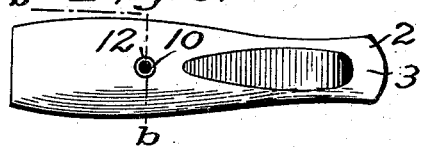
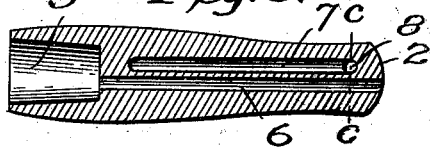
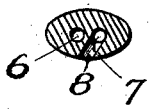
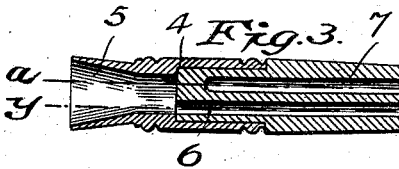
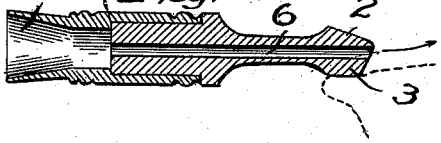
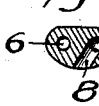
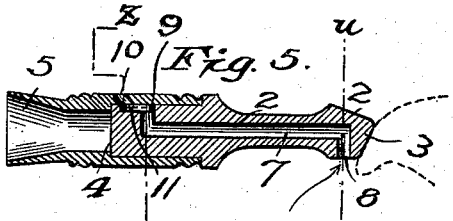
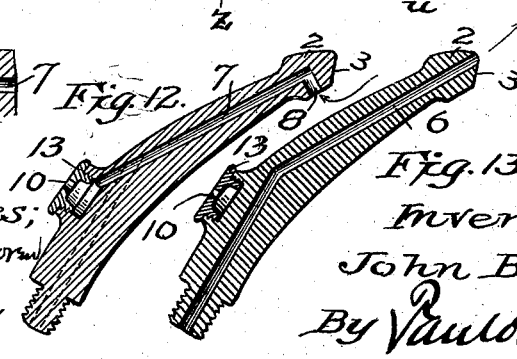
Witnesses;
C. E. Van Dorn
M. C. Gooley
Inventor;
John Bigelow,
By Paul O. Hawley
his attorneys

UNITED STATES PATENT OFFICE.

JOHN BIGELOW, OF MINNEAPOLIS, MINNESOTA.

CIGAR-HOLDER AND TOBACCO-PIPE.

SPECIFICATION forming part of Letters Patent No. 608,170, dated August 2, 1898.

Application filed November 6, 1897. Serial No. 657,607. (No model.)

*To all whom it may concern:*

Be it known that I, JOHN BIGELOW, of the city of Minneapolis, county of Hennepin, State of Minnesota, have invented certain new and useful Improvements in Cigar-Holders and Tobacco-Pipes, of which the following is a specification.

My invention relates to tobacco-pipes and cigar-holders; and the objects of the invention are to provide means whereby the smoke drawn into the mouth may be emitted or discharged through the pipe or holder instead of from between the lips, thereby avoiding the pollution or discoloration of the lips or mustache of the smoker, while saving to the smoker all of the taste and odor of the tobacco.

A further and particular object is to accomplish the the above-outlined results and still retain the popular forms and appearances of common pipes and cigar-holders.

My invention consists generally in a pipe or cigar-holder having a duct connecting the mouthpiece and the bowl and a second duct leading from the mouthpiece and opening through the side of the stem, whereby the smoke drawn through the bowl-duct may be emitted through the second duct, it being unnecessary to open the lips or remove the stem from the mouth.

My invention further consists in various constructions and combinations, all as hereinafter described, and particularly pointed out in the claims.

The invention will be more readily understood by reference to the accompanying drawings, forming part of this specification, and in which—

Figure 1 is a top view of a cigar-holder embodying my invention. Fig. 2 is a side view thereof. Fig. 3 is a horizontal section of the same on the line *x x* of Fig. 2. Fig. 4 is a vertical section on the line *y y* of Fig. 3. Fig. 5 is a vertical section on the line *a a* of Fig. 3. Fig. 6 is a transverse section on the line *z z* of Fig. 5. Fig. 7 is a transverse section on the line *u u* of Fig. 5. Fig. 8 is a view of a modified form of cigar-holder. Fig. 9 is a horizontal section thereof. Fig. 10 is a transverse section on the line *b b* of Fig. 8.
Fig. 11 is a transverse section on the line *c c* of Fig. 9. Fig. 12 is a sectional view of a pipe-stem embodying my invention. Fig. 13 is a similar sectional view in the plane of the bowl-duct. Fig. 14 illustrates a valve which may be used at the outer end of the escape or omission duct.

My cigar-holder may be made in either one or two parts, according to the materials of which it is manufactured. If in one part, the holder will be formed as shown in Figs. 8 and 9, while if two or more parts are used to make up the holder I prefer to manufacture the same as shown in Figs. 1 to 5.

In Figs. 1 to 5, 2 represents the mouthpiece, which is provided with the enlarged end 3. The opposite end of the mouthpiece is circular in cross-section and is made to fit within the cylindrical bowl portion 4, which is provided with the bowl 5, adapted to receive the end of the cigar. An air-tight joint is made between the mouthpiece and the bowl portions of the device, and the mouthpiece is provided with the straight bowl-duct 6, which duct is made in one side or to one side of the center of the mouthpiece. In the opposite side or portion of the mouthpiece is the parallel duct 7. This duct 7 may be drilled entirely through the mouthpiece, but if so will have its ends plugged, as indicated by the solid portions in Fig. 6 and in Fig. 5. At the inward end 3 of the mouthpiece there is an opening 8, leading downward from the duct 7 and through the under side of the end 3. At the opposite end of the duct there is an opening 9, leading upward to a point beneath the hole 10, provided in the portion 4. It is preferred that the hole 10 should be in the middle of the top of the cigar-holder, and as the duct 7 is to one side of the center I preferably provide the lateral duct or groove 11, as shown in Figs. 5 and 6. The hole 8 is preferably drilled slantingly into the duct 7, as shown in Fig. 7, in order that the opening in the under side of the mouthpiece may be in the middle thereof. When the cigar-holder is made in one piece, the bowl-duct 6 is drilled from end to end, and the duct 7 is drilled in the same manner, but has its ends plugged. The downwardly-leading opening at the inner end is drilled slantingly, as shown in Fig. 7, and the escape-opening is drilled from the center of the holder downwardly and to one side into the duct 7. To direct the smoke outwardly in the straight line, I preferably enlarge the outer end of the escape-duct and insert a small tube 12, as shown in Fig. 10. The pipe-stem is made in exactly the same manner—that is, the bowl-duct extends from end to end of the stem, while the escape-duct leads from the under side of the mouthpiece at the inner end to the upper side of the stem at a point some distance from the lips of the user. To finish the pipe-stem and to direct the smoke from the escape-duct outward and upward instead of downward, I employ a tube or finishing-cap 13, similar to the tube 12 (shown in Fig. 10) and having a center hole bored as required by the curve or inclination of the stem. If it is desired, a small valve 14 may be provided at the outlet of the duct 7, in which case the valve and the seat therefor will be made as shown in Fig. 14, the seat being raised above the surface of the stem or cigar-holder, so that the same may be easily cleaned.

It is obvious that the form, construction, and arrangement of the parts herein shown and described may be altered almost indefinitely to suit the taste of the designer, and my invention, therefore, which consists, broadly, in the means whereby the smoke drawn into the mouth may be emitted through the pipe or stem without having it pass through the tobacco, is not confined to the specific constructions herein illustrated.

The use and operation of my cigar-holders and stems are as follows: The cigar is placed in the bowl of the holder or the tobacco in the bowl of the pipe. When the user places the stem or mouthpiece in his mouth, he will, to inhale the smoke, place the end of his tongue beneath the end of the stem or mouthpiece, and thus close the smoke-outlet, while the direct or bowl duct is left open. He may thus hold the cigar or pipe in the usual manner. To expel the smoke from the mouth, the tongue is removed from the outlet-hole and is pressed against the end of the stem or mouthpiece to close the direct duct and prevent the smoke from being blown back through the cigar or through the bowl of the pipe. The tongue is thus used as a valve to alternately close and open the inlet and outlet ducts. The two positions of the tongue are shown by dotted lines in Figs. 4 and 5. The use of the tongue in this way may be avoided by employing the small valve 14 in connection with the smoke-outlet, but in this case some of the smoke will be blown back through the bowl.

The device is most simple in construction and is no more apt to become polluted with nicotine than an ordinary cigar-holder or pipe. No nicotine will lodge in the escape-duct, as the smoke is too rapidly blown through the duct.

Having thus described my invention, I claim as new and desire to secure by Letters Patent—

1. A pipe or holder having a stem provided with two independent ducts one through which the smoke is drawn into the mouth and the other through which the smoke is exhaled only, from the mouth of the smoker, the second duct having an outlet-opening near the outer end of the pipe or holder, substantially as described.

2. A pipe or holder the stem of which has two independent ducts one through which the smoke is drawn into the smoker's mouth and the other through which the smoke is discharged or exhaled and the second of said ducts adapted to be closed by the tongue, substantially as described.

3. In a device of the class described the bowl and the stem, the latter provided with independent inlet and outlet ducts both opening through the mouth piece or part of said stem and one opening from said bowl and the other laterally through the side of said stem substantially as described.

4. The combination of the bowl and stem provided with independent inlet and outlet ducts, opening respectively from said bowl and through the side of the stem and an automatic valve provided in the opening of said outlet-duct to prevent the entrance of air therethrough, substantially as described.

5. The pipe or holder having independent inlet and outlet ducts having their inner ends opening respectively through the end and side of the mouthpiece, substantially as and for the purpose specified.

In testimony whereof I have hereunto set my hand this 29th day of October, A. D. 1897.

JOHN BIGELOW.

In presence of—
C. G. HAWLEY,
M. E. GOOLEY.